April 8, 1941.  F. W. SAMPLE  2,237,450
COUNTERSINK
Filed Nov. 6, 1937
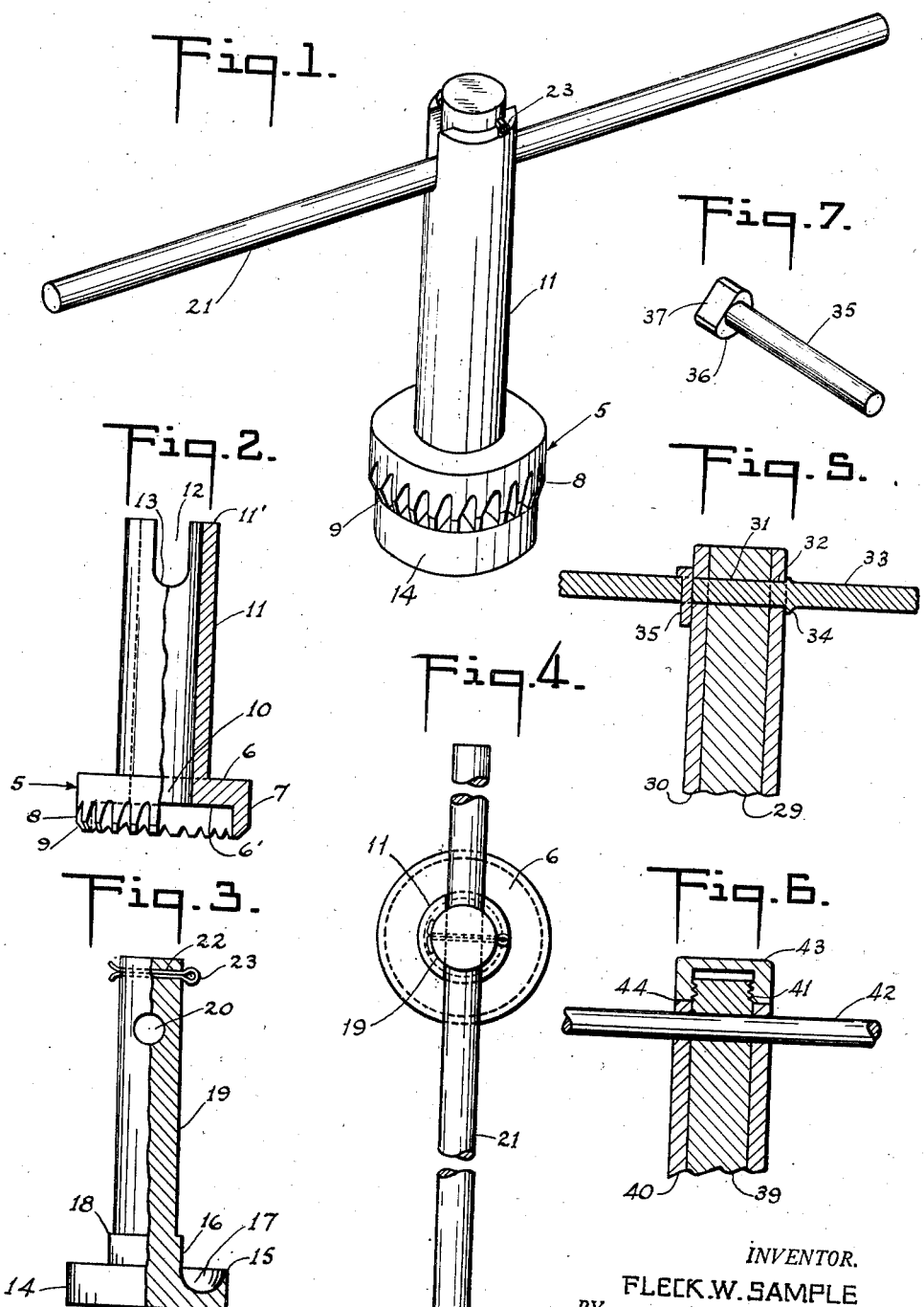
INVENTOR.
FLECK W. SAMPLE
BY Albert M. Parker
ATTORNEYS.

Patented Apr. 8, 1941

2,237,450

UNITED STATES PATENT OFFICE 2,237,450

COUNTERSINK

Fleck W. Sample, Forest Hills, N. Y., assignor to American Flange & Manufacturing Co., Inc., New York, N. Y., a corporation of Illinois Application November 6, 1937, Serial No. 173,124

7 Claims. (Cl. 77—73.5)

This invention relates to a countersink and has to do with a tool of this character particularly advantageous for the formation of gasket surfaces at the mouth of openings in metal containers though its use is not so limited.

An object of the invention is to provide a countersink for forming a tapered surface at the mouth of an aperture which will prevent the cuttings removed in forming such surface from falling down through the aperture.

A further object of the invention is to provide the countersink cutter with a pilot for guiding the same in its cutting operation, which pilot includes the means for preventing the cuttings from falling through the aperture.

Another object of the invention is to form a tool of the above character in such a manner that it may be readily assembled and disassembled for cleaning out the cuttings when needed.

Further objects of the invention will in part be obvious and in part appear in connection with the description taken in conjunction with the accompanying drawing.

Many of the heavy returnable containers for the shipment of liquids in use at present, and some of the lighter gauge ones, employ flanges or sputs for receiving screw threaded bungs at the openings therein of a type which provide a flat upper surface which meets the screw threaded aperture therein at a right angle. Some of the flanges in the heavy containers are pressed in place but the majority, and those which give the most trouble, are welded in place. The plugs or bungs normally employed for closing the openings in these flanges have laterally extending flanges above their screw threads. These flanges, on the insertion of the plugs, have an undersurface parallel to the flat upper surface of the flanges that are affixed to the container walls. Flat annular gaskets are carried by such plugs beneath the flanges thereon. On tightening of the plugs these gaskets are pressed between the parallel surfaces of the opposed flanges in an attempt to prevent leakage of the contents of the container. This manner of gasket application is unsatisfactory for various reasons.

In the welded type of fitting, the welding of the flange to the drum stock involves sufficient heating to create warping and distortion of the gasket surface of the flange so that undulations appear which are not always closed by the type of gasket employed. Furthermore, in fittings where the gaskets are pressed between parallel surfaces there is nothing to prevent the gasket from being deformed laterally with the result that the same will be thicker in some parts than in others. Other causes of leakage are insufficient tightening of the plug and failure to replace the gasket if the same becomes mangled by the application of too great a tightening effort. The heavy returnable containers in service equipped with closures of this type have a life of from eight to ten years. It has become necessary, in the interests of safety, to provide such containers with closures which will eliminate the causes of leakage heretofore existing.

The device of the present invention solves the above problem by enabling the already installed flanges to be provided with tapered gasket receiving surfaces possessing the characteristics of the companion surfaces as disclosed in the Shera Patent No. 1,982,145. In making this conversion, it is merely necessary to form a surface possessing the desired characteristics by countersinking the mouth of the already present aperture. In doing so, however, it is necessary to accurately control the extent and angle of the gasket receiving surface and to prevent the material, necessarily cut away in forming such surface, from falling inside the container. All of these requisites are met in a simple and effective manner in the device of the instant invention.

For a fuller understanding of the nature and objects of the invention, reference should be had to the following detailed description taken in connection with the accompanying drawing in which:

Figure 1 is a perspective view of the device according to the preferred embodiment of this invention.

Fig. 2 is an elevation, partly in section according to Fig. 1, showing the cutter and sleeve for supporting the same.

Fig. 3 is an elevation, partly in section, of the pilot member of the Fig. 1 construction with the rod for mounting the same.

Fig. 4 is a plan view of the assembled tool shown in Fig. 1.

Figs. 5 and 6 are fragmentary sectional elevations showing modified constructions for locking the parts of the tool in assembled relation.

Fig. 7 is a perspective of the locking pin shown in Fig. 5.

As shown in Figs. 1 and 2, an annular cutting head 5 is provided having an apertured disc-like portion 6 with a downwardly extending collar portion 7 around its periphery. Around the bottom of collar portion 7 there is provided a plurality of cutting teeth 8 whose cutting surfaces taper downwardly and inwardly, as shown at 9, in order to give the proper taper to the surface being cut. Extending upwardly from disc-like portion 6 and having its bore in registry with the aperture 10 therein is a sleeve portion 11 whose upper end is recessed downwardly at diametically opposed positions as shown at 12. The bottoms 13 of these recesses are curved on a diameter equal to the width of the recesses.

In Fig. 3 there is shown a pilot member for engagement with the cutting member of Fig. 2. This member has a disc-like pilot 14 whose outside diameter is exactly that of the aperture whose mouth is to be countersunk, which diameter, as best shown in Fig. 1, coincides with that established by the lower edges of the downwardly and inwardly tapered cutting teeth. These teeth and the engaging surface of the pilot head meet at substantially a line contact as shown at 15 in Fig. 3. Extending around the upper surface of cutting head 14 and utilizing substantially all of the distance from edge 15 to shank 16 is a cuttings or refuse channel 17. As shown this channel is semi-circular in cross section, but obviously any other desired shape may be employed.

Shank 16 is inset slightly to form a shoulder 18. Extending upwardly from shoulder 18 is a rod 19 which is formed for reception within sleeve 11 and therefore has a diameter substantially the same as that of aperture 10. Spaced downwardly from the top of rod 19 and extending diametrically thereacross is aperture 20 designed to register with the bottom 13 of recess 12 and, when in assembled relation therewith, to receive the operating bar or handle shown at 21 in Figs. 1 and 4. Rod 19, which is slightly longer than sleeve 11, has adjacent its top a diametrically extending aperture 22 in which is received a cotter pin 23 for engagement with the top surface 11' of sleeve 11 when the elements of the tool are in assembled relation. Shank 16 is equal in height to the underside of skirt 7 so that on assembly of the pilot member with the cutting member, shoulder 18 will engage the undersurface 6' of disc 6 thereby locating edge 15 in registry with the bottom of cutting surfaces 9.

In order to assemble the tool, shown in Figs. 1 to 4, all that is necessary is to insert rod 19 into bore 10 until shoulder 18 engages surface 6' and turn rod 19 by grasping pilot head 14 until aperture 20 registers with recess 12. Handle 21 is then inserted into proper position and then, in order to lock the device in assembled relation, cotter pin 23 is inserted through aperture 22 and its open end spread whereby such end and head 23 lie against the upper surface 11' of sleeve 11.

In the modification shown in Figs. 5 and 7, rod 29 is shown to be the same height as sleeve 30, while such members are bored at 31 and 32 respectively to receive handle member 33 which carries an annular shoulder 34 for engagement with the outer surface of sleeve 30 on one side thereof. On the opposite side of sleeve 30, handle 33 is bored to receive pin 35, best shown in Fig. 7. Said pin is provided with a head 36 having one face 37 either flat or curved slightly concavely in order to seat against sleeve 30 to prevent turning of pin 35. Obviously this construction provides a means for locating the elements of the tool in assembled relation, but yet a means of such a character that the tool may be readily disassembled.

In the modification shown in Fig. 6, rod 39 extends slightly above the upper end of sleeve 40 and has its extending portion screw threaded as shown at 41. Rod 39 and sleeve 40 are bored in the same manner as in the form of Fig. 5 to receive therein a handle 42. In this modification the elements of the tool are locked together by means of a cap 43 which is interiorly threaded to engage threads 41 and whose lower annular face engages the upper end of sleeve 40 as shown at 44.

In employing a tool of this invention, pilot head 14 is inserted into the aperture whose mouth is to be given an outwardly tapered surface. The tool is turned by means of handle 21, in the usual manner for tools of this type, until the proper tapered surface is formed by cutting teeth 9—which factor can be ascertained in any of the well known manners. The tool is then removed and inverted in order to shake out as much as possible of the refuse or cuttings collected in channel 17. Inasmuch as in expelling the cuttings in this manner reliance must be placed upon the openings between the teeth, it is obvious that it will be necessary from time to time to disassemble the tool for purposes of adequate cleaning. This can readily be done by sliding out handle 21 and removing cotter pin 23 or one of the other locking devices shown in Figs. 5 and 6. In this manner channel 17 can be cleaned out very simply and the tool reassembled readily for the next countersinking operation.

Though the use of this tool has been described for forming gasket surfaces at the mouths of apertures in containers, it is obvious that its application is not so limited, for a ready field is open for it in any situation where a surface of the character described is desired, and particularly where it is desired to prevent the cuttings from such an operation falling through the aperture.

Having described my invention and what I claim as new and desire to secure by Letters Patent is:

1. A countersink for forming a tapered surface at the mouth of an aperture, comprising a cutting member, a pilot member beneath said cutting member for reception in an accurate fit in the aperture to locate and guide said cutting member and a depression in the face of said pilot member in opposed relation to said cutting member for receiving and retaining the cuttings removed by said cutting member.

2. In a tool for forming a tapered surface at the mouth of a threaded aperture in the wall of an already formed container, cutting means, means closely receivable in said threaded aperture and mounted in advance of said cutting means, for receiving and retaining the cuttings removed by the cutting means, and slidably engageable means for mounting said cutting means and receiving means in cooperative relation, said last named means being readily slidably separable whereby the tool may be quickly disassembled for cleaning said receiving and retaining means.

3. In a tool of the character described, concentric mounting members, an annular cutter on one of said members and a cuttings receiving means annularly depressed in opposed relation to the end of said cutter on the other of said members and readily removable means for locking said members together to hold said cutter and said receiving means in cooperative relation whereby the parts of said tool are held in positive relation when assembled but may be readily disassembled for cleaning out said cuttings receiving means.

4. In a tool of the character described, a sleeve, a cutter mounted on the end of said sleeve, a rod within said sleeve, a pilot member on the end of said rod adjacent said cutter and overlying said cutter and handle means for turning said cutter, registering portions of said sleeve and rod aligned when said tool is assembled, said registering portions formed to slidably receive said handle means to prevent relative rotation of said sleeve and rod when said assembled tool is employed.

5. In a tool for forming a tapered surface at the mouth of a threaded aperture in the wall of an already formed container, a sleeve, an annular cutter mounted on the end of said sleeve, a rod within said sleeve and extending throughout the length of the same, a pilot member formed to closely fit said threaded aperture on the end of said rod adjacent said cutter and overlying said cutter, the face of said pilot member opposed to said cutter being annularly depressed to form a cuttings receiving channel, handle means for turning said cutter and registering apertures in said rod and sleeve for slidably receiving said handle means to interlock said sleeve and rod against relative rotation.

6. In a tool of the character described, a sleeve, a cutter mounted on the end of said sleeve, a rod within said sleeve, a pilot member on the end of said rod adjacent said cutter and overlying said cutter, means for turning said cutter and means engaging said turning means and said sleeve for locking said sleeve and rod in assembled relation.

7. In a tool of the character described, a sleeve, a cutter mounted on the end of said sleeve, a rod within said sleeve, a pilot member on the end of said rod adjacent said cutter and overlying said cutter, means for turning said cutter and cap means for locking said sleeve and rod in assembled relation.

FLECK W. SAMPLE.